(12) United States Patent
Marvin et al.

(10) Patent No.: US 7,343,379 B2
(45) Date of Patent: Mar. 11, 2008

(54) SYSTEM AND METHOD FOR CONTROLS

(75) Inventors: Kyle Marvin, Kingwood, TX (US); David Read, Bellevue, WA (US)

(73) Assignee: Bea Systems, Inc., San Jose, CA (US)

( * ) Notice: Subject to any disclaimer, the term of this patent is extended or adjusted under 35 U.S.C. 154(b) by 375 days.

(21) Appl. No.: 11/041,588

(22) Filed: Jan. 24, 2005

(65) Prior Publication Data

US 2005/0262091 A1   Nov. 24, 2005

Related U.S. Application Data

(60) Provisional application No. 60/573,747, filed on May 21, 2004.

(51) Int. Cl.
*G06F 7/00* (2006.01)
*G06F 17/30* (2006.01)
*G06F 9/00* (2006.01)

(52) U.S. Cl. .................. 707/101; 707/10; 718/101

(58) Field of Classification Search ............ 707/101, 707/10; 718/101
See application file for complete search history.

(56) References Cited

U.S. PATENT DOCUMENTS

| | | | |
|---|---|---|---|
| 6,327,594 B1* | 12/2001 | Van Huben et al. | 707/200 |
| 6,360,363 B1* | 3/2002 | Moser et al. | 717/170 |
| 6,754,659 B2* | 6/2004 | Sarkar et al. | 707/10 |
| 6,857,012 B2* | 2/2005 | Sim et al. | 709/222 |
| 7,047,522 B1* | 5/2006 | Dixon et al. | 717/131 |
| 2003/0167455 A1* | 9/2003 | Iborra et al. | 717/105 |
| 2004/0024812 A1* | 2/2004 | Park et al. | 709/203 |

\* cited by examiner

*Primary Examiner*—Kuen S. Lu
(74) *Attorney, Agent, or Firm*—Fliesler Meyer LLP

(57) ABSTRACT

Controls can reduce the complexity and learning curve associated with acting as a resource client by utilizing a unified client model that can provide access to diverse types of resources, the configuration options, operations, and events exposed by a resource. Controls can also provide transparent (to the client) resource management of connections, sessions, or other resources to be obtained on behalf of the client. In addition, an external configuration module can be utilized to define how properties can be bounded by external configurations, enabling the overriding of attributes of the resource at deployment time.

20 Claims, 7 Drawing Sheets

```xml
<?xml version="1.0" encoding="UTF-8"?>
<weblogic-extension xmlns="http://www.bea.com/ns/weblogic/90">
  <module-provider>
   <name>wlw-temp-module</name>
   <module-factory-class-name>com.bea.tbd</module-factory-class-name>
  </module-provider>
  <custom-module>
    <uri>wlw-annotations</uri>
    <provider-name>wlw-temp-module</provider-name>
    <configuration-support>
      <base-root-element>annotation-manifest</base-root-element>
       <config-root-element>annotation-overrides</config-root-element>
       <base-namespace>http://www.bea.com/.../external-config/</base-namespace>
       <base-uri>META-INF/annotation-manifest.xml</base-uri>
       <config-uri>META-INF/annotation-overrides.xml</config-uri>
       <base-package-name>weblogic.j2ee.descriptor.wl</base-package-name>
    </configuration-support>
  </custom-module>
</weblogic-extension>
```

Figure 6

```
/**
 * @wld:bean
 */
public interface MemberBean {

/** @key */
  String getMemberName();
  void setMemberName(String membername);

/** @initFrom member-value */
  String getMemberValue();
  void setMemberValue(String stringvalue);

/**
   * @dynamic
   * @return externally overriden value.
   */
  String getOverrideValue();
  void setOverrideValue(String stringvalue);

/**
   * @return externally overriden value.  This is non-dynamic
   */
  String getBindingOverrideValue();
  void setBindingOverrideValue(String stringvalue);

SYSTEM AND METHOD FOR CONTROLS

CLAIM OF PRIORITY

This application claims priority from the following applications, which are hereby incorporated by reference in their entireties:

U.S. Provisional Patent Application No. 60/573,747, entitled SYSTEM AND METHOD FOR CONTROLS by Kyle Marvin et al., filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of controls of client access to system resources.

BACKGROUND

An enterprise application software framework, such as Java® 2 Enterprise Edition (J2EE) platform, provides a rich set of resources, which include but are not limited to, component types, protocols, and system services that can be used to assemble an application or a service. As the scope of the J2EE architectural design space grows, the complexity of assembling solutions has also grown. It is important to properly manage the resources such that they can be used efficiently and correctly, since the cost of a subtle mistake can cause poor system performance or even system failure. The complexity and diversity of client access models to J2EE resources, however, stands in direct opposition to achieving this goal. Many of the resources in J2EE provide their own set of mechanisms for how they can be accessed, how usage can be parameterized, and how resources associated with them (connections, sessions, etc) can be managed. Depending upon the system architecture and components constructed by the system developer, the application developer, who may not be very experienced with object-oriented design and Java®/J2EE, might have to learn a variety of new technologies and interfaces(APIs) to work within the architecture. Since each individual J2EE technology presents a unique set of client APIs, configuration models, and resource management strategies, and each of which is unique, the learning curve is high and the potential for tooling and automation is relatively low.

Beyond adding to overall complexity, the diversity of J2EE resource types and access mechanisms also makes it difficult for tools to offer assistance to developers who need to use them. Specific resource types often need custom code in order to define wizards or property-driven user interface that aids a client of the resource. There has been few common mechanism for discovering the potential set of configurable attributes for a resource type, meaning that any graphical presentation of client attributes or wizards must be custom-authored based upon the underlying resource type.

Although significant progress has been made towards simplifying the deploying of enterprise application components (resources), the client access model to these components remains fragmented. Even where simplification is being pursued, it is being done in a manner that is often resource-specific. Although such resource-specific approach offers the potential for easier use of a particular resource type, a lack of unification or commonality in the access mechanisms makes it difficult for tools to support the development process and still presents a learning curve for users.

BRIEF DESCRIPTION OF THE DRAWINGS

FIG. 6 is the XML source code of an exemplary descriptor defining the association between the annotation metadata and the control in accordance to one embodiment of the invention.

FIG. 7 is the exemplary source code supporting the overriding of dynamic/non-dynamic properties in accordance to one embodiment of the invention.

DETAILED DESCRIPTION

Figure 1:
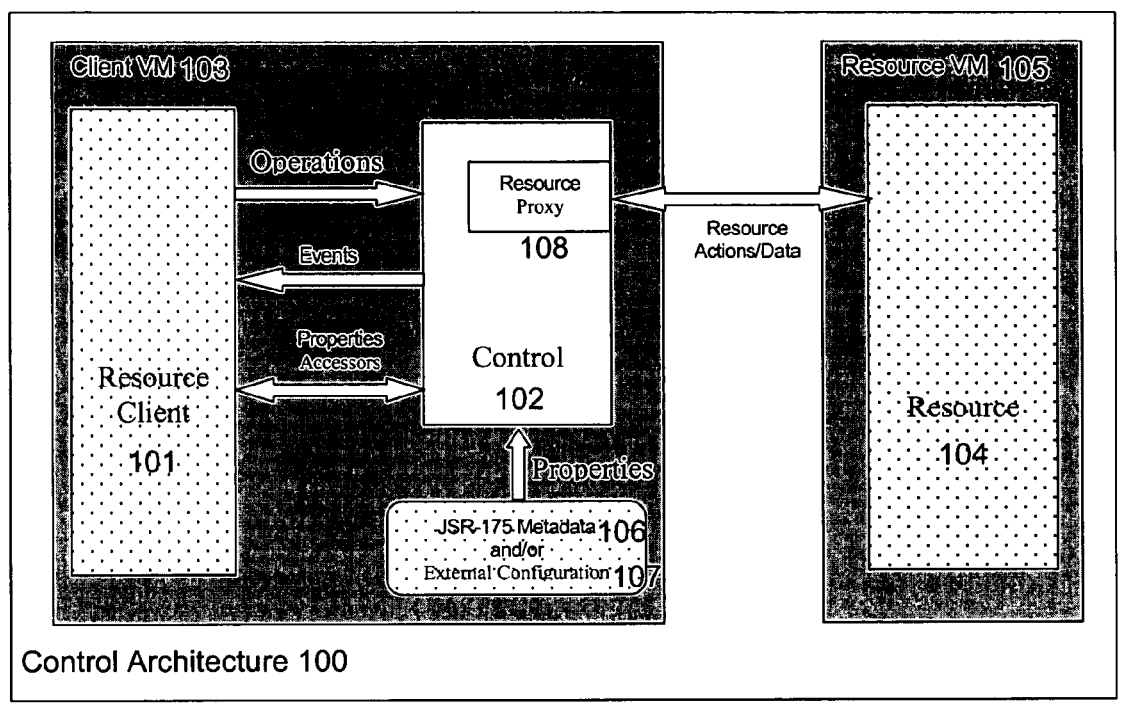
FIG. 1 is an illustration of an exemplary control architecture in one embodiment of the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention support a control architecture, which provides a common framework and configuration module for how enterprise resources can be exposed to clients via controls. This architecture does not replace, but provides a unifying layer on top of existing resource access models to provide consistency and simplification. A control can be based upon an object-oriented software component model and developed to be lightweight and executable in variety of environments. Here, the object-oriented software component model can be but is not limited to, a Java® bean, an enterprise Java® bean (EJB), an interface, a class, a module, and other suitable concepts based on, Java®, C++, CORBA, RMI, DOM, and other suitable object-oriented programming language. Java® and EJB will be used to illustrate the various embodiments of the invention in the following context.

The control can extend the basic concepts of the object-oriented software component to add the new metadata attribute/property/annotations definition conventions that enable introspection and presentation of available configuration options and value validation, and to allow an IDE to define new control types that are pre-configured for specific resource access cases. Examples of resource attributes that might be parameterized by metadata include by are not limited to, resource or protocol configuration, message formats, and other suitable contents. Such an extensible model allows the definition of customized and pre-configured views (operations), and a resource management strategy that enables client-side resource (which includes but are not limited to stubs, handles, connections, sessions, etc.) to be managed transparently on behalf of the client. The control architecture can be designed to be user-friendly, especially in an integrated design environment (IDE), so defining and configuring client access to resources can be a property or wizard-driven process, and can be represented using visual design metaphors.

In various embodiments of the present invention, controls can reduce the complexity and learning curve associated with acting as a client of J2EE resources by providing a unified client module that can provide access to diverse types of resources, the configuration options, operations, and events exposed by a resource. Controls can also provide transparent (to the client) resource management of connections, sessions, or other resources to be obtained on behalf of the client, held for an appropriate resource scope to achieve best performance, and then released. This resource management mechanism frees the client from having to learn or understand the acquisition mechanisms, and from having to directly participate in guaranteeing their release. The control architecture can provide such functionality by defining a simple resource management contract that cooperates with an outer container to manage resources at the appropriate scope (for example, bounded to a transaction context or outer container operation or request scope).

The goal of the control architecture is not to define the standards for how specific resource types will be exposed; rather, it is to help that when exposed they will have a commonality in mechanism that makes them easier to understand and use by developers. Beyond the common programming model presented to developers, controls also offer resource discovery and property introspection mechanisms, such as a metadata and/or an external configuration module, which allow an IDE to locate available controls, present and interactively configure their properties. Since controls expose operations, events, and properties using common mechanisms, an IDE can support client use based upon these mechanisms as well as a common authoring model for defining new types of controls, without the need for a large amount of resource-specific code. Using a common client module allows a single base of IDE code to use a variety of resource types, based upon introspection. Using a shared module (and code) for presenting and configuring client access also results in a consistent user experience when working with resources, both on the client and authoring side. While the developer might be using a diverse set of resources in the course of building a user interface, service, or application, the learning curve from a user interaction perspective can be reduced in the same way that it is reduced from an interface perspective by having a common module.

FIG. 1 is an illustration of an exemplary control architecture 100 in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, the resource client 101 represents user code in, for a non-limiting example, a web application, service, or application that needs access to the resource 104. The resource client 101 and supporting control 102 can live in the same client virtual machine (VM) 103 and communicate directly using local Java® method invocations. The accessed resource 104 may or may not reside within the same machine and within a resource virtual machine 105 instead, depending upon the nature of the resource and the application server environment. Access to the resource 104 may be parameterized by metadata annotation 106 declared directly on the control instance, class, or method declarations, or by properties provided to the factory-based constructor. In addition, an external configuration module (manifest) 107 can be utilized to define how properties can be bounded by external configurations (e.g., deployment descriptors/plans), enabling the overriding of attributes of the resource at deployment time.

In some embodiments, the control itself will often hold a reference to a resource proxy 108 associated with the accessed resource, and will use the proxy to enact operations requested by the (resource) client. Examples of such resource proxies include EJB home or remote stubs, Java® Message Service (JMS) connections or sessions, web service client proxies, and other suitable concepts. The control manages the state and lifetime of this proxy reference, coordinated by a set of resource management notification events that are provided to it indicating how long the proxy resources can be held by an outer container that determines the resource scope. The actual communication between the resource proxy and the resource itself is generally a function of the underlying resource. For EJBs, it might reflect communication via Remote Method Invocation (RMI) or local Java® invocation.

In some embodiments, the control architecture can be implemented in Java® programming language, wherein a control (also referred as a control bean) can be based on a Java® bean. The resources can be deployed in J2EE environment, and the metadata annotations can be defined based on the extensible model of JSR-175 or via external configuration file in XML format. To the client, controls appear as Java® beans that can be instantiated and used for resource access. Properties that parameterize resource access can be set using JSR-175 metadata attributes, as arguments to instantiation or even bound using externalized configuration data. These configuration mechanisms are consistent across all resource types, and controls provide the appropriate mapping to resource-type-specific interfaces such as APIs or deployment descriptor entries. Controls present operations on the resource as methods on the Java® bean interface. They also support a two-way communication style where resource events can be delivered to a registered listener.

Figure 2:
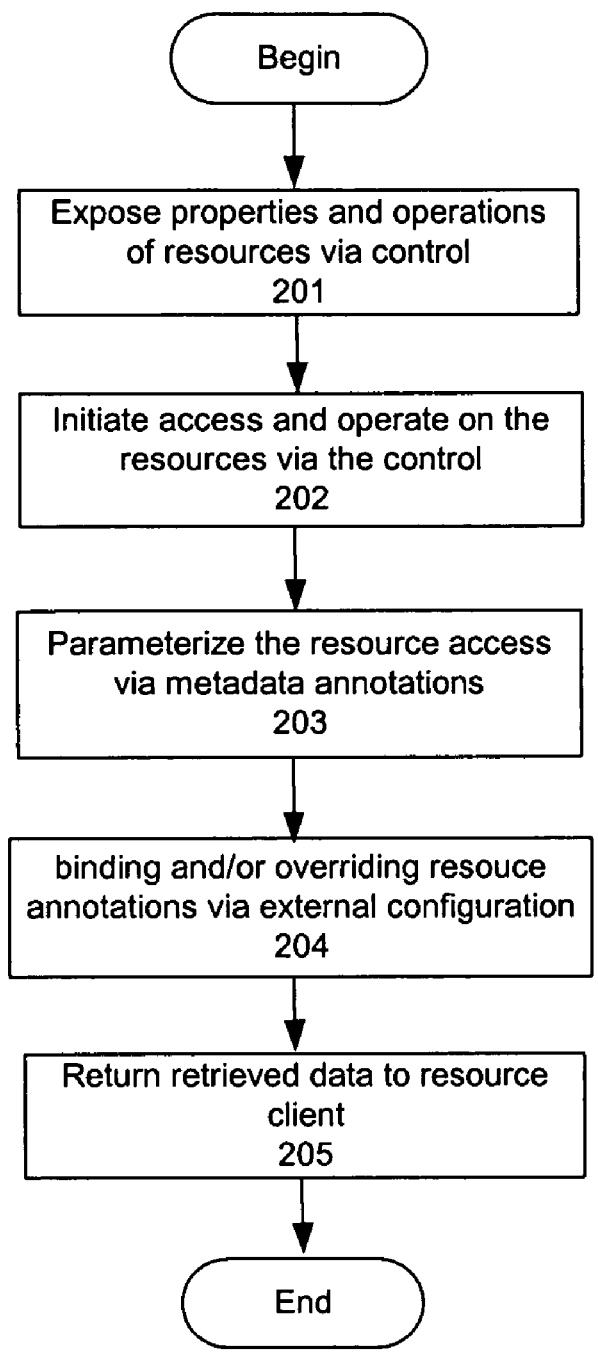
FIG. 2 is a flow chart illustrating an exemplary process of resource access via control in accordance to one embodiment of the invention.

FIG. 2 is a flow chart illustrating an exemplary process of resource access via control in accordance to one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, properties and/or operations of diverse types of resources can be exposed on a control at step 201. A resource client may then initiate resource access and operate these properties via the control at step 202. Access to the resource can be parameterized by metadata annotation at step 203, and binding and/or overriding between properties and external configurations can be defined at step 204. Finally, data retrieved from the resource may be returned by the controls to the resource client at step 205.

In some embodiments, controls can support a two-way interaction style with resource clients. The set of operations callable by the client are defined on the base public interface of the control, and the set of possible callbacks (events) that might be delivered back to the client from the resource are defined, by convention, on an optional inner Callback interface of the base public interface. Here is a simple example that represents the client interface to a timer service resource:

```
public interface TimerControl extends Control
{
    public void start( ) throws IllegalStateException;
    public void stop( );
    public interface Callback
    {
        public void onTimeout(long time);
    }
}
``` wherein TimerControl is the base public interface for timer control, which supports operations related to setting and using a timer (start, stop), as well as a single event (onTimeout) that will be delivered when the timer fires.

Figure 3:
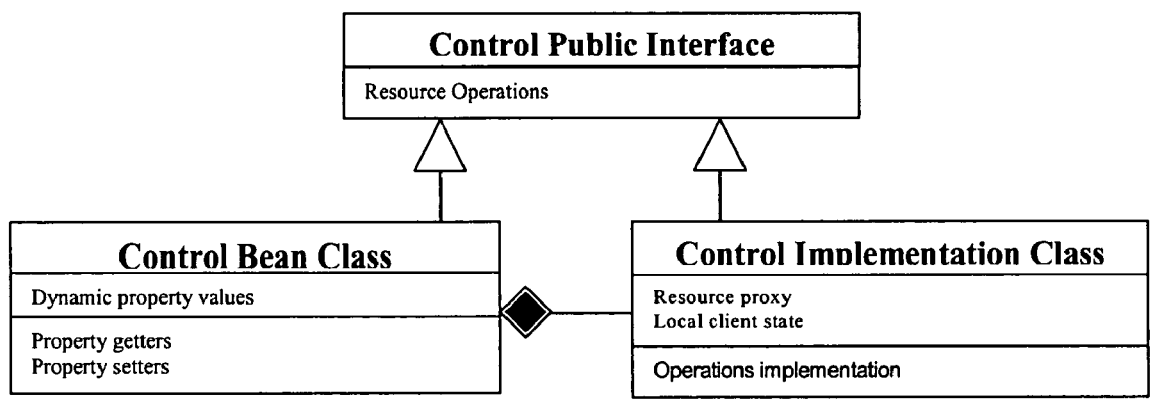
FIG. 3 is an illustration of the relationship and functions of various classes of a control in accordance to one embodiment of the invention.

In some embodiments, the definition of a new resource type in a control is composed of three distinct classes. The relationship and functions of these classes is summarized in FIG. 3:

The public Control Public Interface may define the set of operations and events that are exposed for the resource type. In the earlier TimerControl example, TimerControl is the public resource interface for the timer service resource.

The private Control Implementation Class may provide the implementation of resource operations as well as proxy resource management. In the TimerControl example, there would be a class (TimerControlImpl) that provides the implementation of the timer operations using the supporting resources of a J2EE timer service.

The Control Bean Wrapper Class is the Java® bean wrapper around the implementation class that provides the property accessor implementation, per-instance storage of dynamic properties, and property resolution services. It may also perform event listener routing and initialization of contextual services and nested controls.

Figure 4:
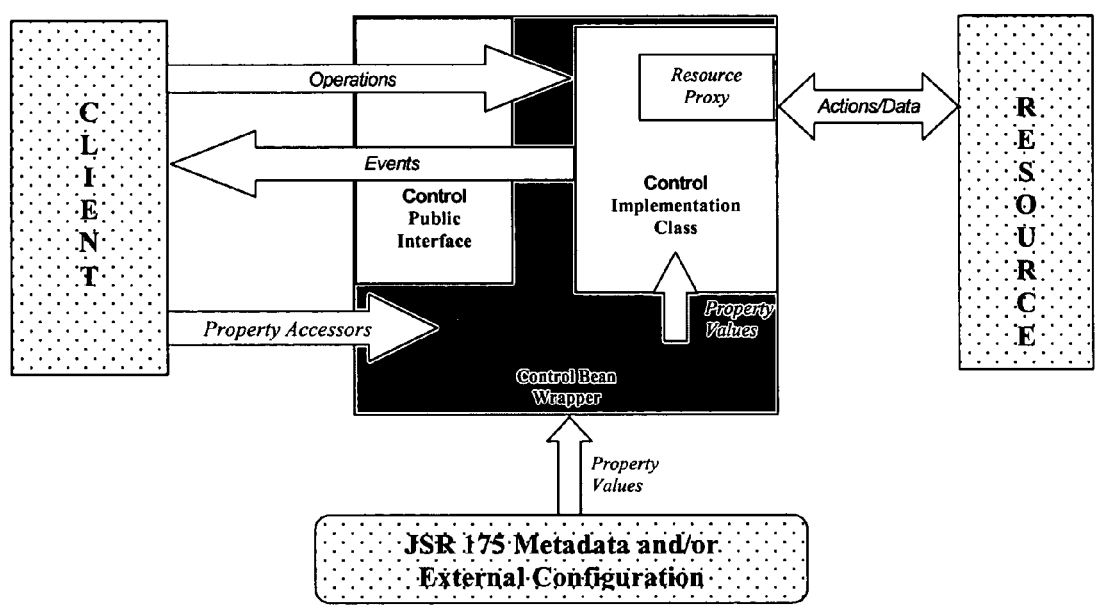
FIG. 4 is an exemplary control architecture illustrating how classes of a control can work together to fulfill the runtime responsibilities shown in FIG. 1.

FIG. 4 is an exemplary control architecture illustrating how these three classes can work together to fulfill the runtime responsibilities shown in FIG. 1.

In some embodiments, controls can also support an extensibility model that allows operations on a resource to be defined using a customized interface that extends the base public resource interface, and defines metadata-annotated operations on the resource. This enables the construction of "views" or specific resource use cases, defining a more-specific set of resource operations or events. For example, it is possible to define a custom operation on a control type representing a JMS queue resource, that uses metadata attributes to define the format of the message, with message contents set from message parameters. This enables the professional developer to construct new customized facades for resource access with a minimum of effort. As another non-limiting example, there can be a basic DatabaseControl that provides simplified database access using JDBC, and hides and manages the details of how JDBC connections are acquired and released from the client programmer.

In some embodiments, controls may have a flexible model for how they can integrate with any outer container or component model and for how services will be obtained from them, given that controls can be used a variety of different runtime contexts: within web tier containers (servlets, JSP), within web services, standalone Java® applications, even from within EJBs.

In some embodiments, a control may access contextual services to support resources. Here, services may be contextual because the actual implementation might vary based upon the type of container in which the control is running. As a non-limiting example, client-side contextual services might be security services to access a credential repository or to provide data encryption/decryption services. A security contextual service might provide different implementations for Controls running in the EJB tier (by delegating to an enclosing EJBContext) vs. Controls running in the Servlet container vs. Controls running in a standalone Java® application.

In some embodiments, contextual services can also define event models, so that contextual services can also declare and fire events on controls that have registered in interest. As a non-limiting example, a basic ControlContext contextual service is provided as part of the base control architecture. This contextual service provides common services for controls, such as access to properties, as well as a set of lifecycle events for controls.

Figure 5:
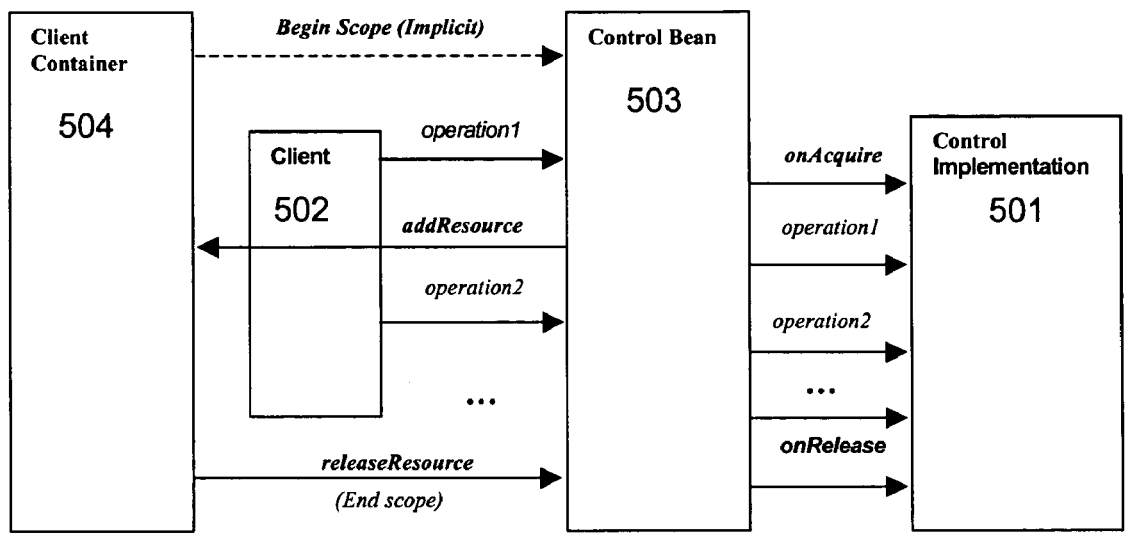
FIG. 5 is an illustration of the basic mechanics of an exemplary resource management contract in accordance to one embodiment of the invention.

In some embodiments, the control architecture defines a unique set of events and a resource management contract between the controls and the execution container they are running within. The basic mechanics of an exemplary resource management contract is shown in FIG. 5. The primary motivations is to:

Enable the control implementation 501 to implicitly obtain supporting client-side resources (connections, sessions, etc) on behalf of the client 502.

Enable the control (bean) 503 to hold these client-side resources for an appropriate resource scope (across multiple client invocations) to achieve optimal performance and utilization of resources.

Ensure that client-side resources obtained on behalf of the client are consistently released at the end of the appropriate resource scope.

The key is that resource management should be transparent to the client. The control resource management design can make the control implementation class the responsible party, instead of placing this burden upon the client of the resource. This can be achieved by defining two basic events that will be delivered to the control implementation class:

onAcquire: this event is delivered to a resource implementation on the first client invocation within a resource scope, providing an opportunity to obtain any basic client-side resources necessary to support operations on the control. By a non-limiting example, a control that was providing access to a JMS queue might use the on Acquire event to obtain a JMS connection, session, and a reference to the target queue.

onRelease: this event is to be delivered to every control implementation instance that has received an onacquire event during the current resource scope, at the end of that scope, providing the opportunity to release any of the resources obtained during on Acquire event processing. In the previous example, the JMS connection and session could be appropriately closed and the queue reference reset to null.

In some embodiments, the definition of the resource scope can be delegated to the client container 504 within which the control is executing. By a non-limiting example, if the control is executing within the web tier, the resource scope might be bounded by the duration of processing of the current http request. For a control running in the EJB tier, the resource scope might be the current EJB method invocation or possibly even by the current transaction context.

In some embodiments, the client container can have two basic responsibilities:

- Maintaining an accumulated list of controls that have acquired resources; and
- Invoke an interface such as releaseResources API on each of them at the end of the appropriate resource scope.

The control is responsible for delivering the on Acquire event to the control implementation instance, for notifying the client container that resources have been obtained, and/or for delivering the on Release event to the implementation when notified by the client container.

Notice that FIG. 5 also demonstrates the transparency of resource management to client code itself: the client is only invoking operations, and all of the necessary underlying resource management is done by interactions between the client container 504, control bean 503, and control implementation 501.

In some embodiments, the control architecture can also support a composition model, making it possible to define a control type that nests another control type. Such a model also makes it possible to extend a physical resource abstraction with a logical abstraction that lives entirely on the client side. Composition is useful for the construction of facades or to add additional client side operations, events, or state to the nested control abstraction. Composition of controls can be supported by the mechanisms defined by the Java® Beans Runtime Containment and Services Protocol.

In some embodiments, the control architecture can provide a simple Java® archive (JAR)-based packaging model that enables controls to be packaged for distribution. Such a model defines a simple manifest file that describes the set of controls within a jar, and how controls can be discovered within a jar, enabling system vendors, third party providers, or J2EE system developers to distribute controls that offer client access to provided services or components. Tools can quickly introspect, discover and build palettes of available controls based upon this packaging model. It should be possible to place control jar files at a variety of classloader scopes (system, application, or module) for client use.

In some embodiments, the control architecture can offer two related client models with slight different characteristics:

- A programmatic client model, wherein the client explicitly specifies control instance attributes to constructors, and does direct registration of event listeners and event handling.
- A declarative client model, wherein control instance attributes can be specified using JSR-175 metadata (annotation), and event routing is implicit based upon a set of basic naming conventions.

The two offer the same basic functionality, but in the programmatic model the client takes explicit responsibility for the construction of control instances and event routing; in the declarative model, the control container provides initialization and routing services on behalf of the client. The programmatic model directly exposes the details of how initialization and event handling takes place, so it may provide a more comfortable environment for the professional developer or one who is already comfortable with constructing and handling events from Java® beans. On the other hand, the declarative model hides many of these details, making it much easier for corporate developers (and development tools) to quickly declare and configure control instances and create event handling code to service events.

In some embodiments, the programmatic client model can follow the basic pattern of Java® bean construction and event handling:

```
TimerControlBean   myTimerBean   =   (TimerControlBean)
ControlBean.instantiate( classloader, "com.myco.TimerControlBean");
myTimerBean.setTimeout("3 seconds");
myTimerBeans.addTimerControlEventListener(
    new TimerControlEventListener( )   // anonymous event handler class
    {
        public void onTimeout(long time)
        {
        // timer event handling code
        }
    } );
```

In the non-limiting example above, a factory-based instantiation API (Controls.instantiate( )) is used to construct a new instance of the TimerControlBean. The TimerControlBean is programmatically initialized to the desired configuration, and then an event handler (based upon the declaration of an anonymous inner class) is used to service events from the bean.

The following non-limiting example is equivalent to the preceding example, but uses declarative style construction and event routing instead:

```
@Timer(timeout="3 seconds") TimerControlBean myTimerBean;
...
public void myTimerBean__onTimeout(long time)
{
    // timer event handling code
}
```

In this example, the TimerControlBean instance is declared with attributes specified using JSR-175 metadata. There is no implicit construction of the bean instance; the client container for the TimerControlBean will recognize the presence of the control declaration and will implicitly initialize the instance. Additionally, it (also implicitly) declares the necessary event listener class and routing code to deliver on Timeout events on the TimerControlBean instance to the declared event handler.

In some embodiments, the control architecture may provide a flexible configuration model on how access to resource attributes may be resolved. Properties can be used to parameterize resource access, providing attributes such as Java® Naming and Directory Interface (JNDI) names for local resources, web service URLs, connection attributes, and other suitable concepts. It is possible to introspect a control and set the available set of properties.

In some embodiments, the control architecture can support a list of property configuration mechanisms for a particular control and a base set of properties that are associated with the control. These mechanisms may include:

Programmatic property accessors on the control, which specifies the attributes in the set that should be settable dynamically using property getters/setters on instances of the type. This can be used to support auto-generation of control types with property accessors based upon the attribute set.

Metadata on control declarations, which specifies the attributes in the set that can be configured using metadata annotation, such as JSR-175, and the syntax for doing so. This enables an IDE to present property-style selection of metadata-based attributes and values, as well as providing the ability to validate the annotations on any usage of the type and relationships between annotations.

External deployment descriptor-style configuration, which derives a schema for representing the configuration of the attribute (annotation) set using a persistent file such as XML. Resource attributes can be managed and/or overridden without requiring changes to source code via an external property binding module. These can be used in common tools for state management (to persist the representation of a control instance and its attributes as XML) as well as in an externalized configuration mechanism that allows attributes to be bound externally using deployment descriptor-style configuration files. This makes the construction of instance introspectors and administrative tools much more straightforward, as compared to using ad-hoc deployment descriptor formats.

In some embodiments, the three property configuration mechanisms have a well-defined property resolution precedence that is implemented and enforced by the control base implementation class, wherein the precedence (from highest to lowest) can be:

Programmatically set property value
Externally configured property value
Metadata-defined property value In other words, the resource client can override a value defined by either externalized configuration or metadata, and a value defined in externalized configuration can override a metadata-defined value.

In the earlier TimerControl example, an attribute might exist to set the timeout value of the timer. For this attribute, it should be possible to set the value programmatically, externally, or using declarative annotations. The declaration of the TimerControl as a JSR-175 attribute and member might look something like:

```
Package com.myco;
public @interface Timer {
    /** @return timeout Duration as string */
    @AccessModes (property-style=true, external=true)
    String timeOut( );
    ...
}
```

This defines a metadata attribute (com.myco.Timer) that has a String member value named 'timeOut'. The AccessModes meta-attribute specifies that the member can be set via Java®Bean property-style accessors and external configuration, as well as using declarative metadata. An example of setting the timeOut member of the Timer metadata attribute inside of client code might look like:

```
@Timer(timeout="3 seconds")
``` public TimerControlBean myTimerBean;

Since the AccessModes attribute indicates that a property-style accessor is enabled, the TimerControlBean may also advertise the following Java® bean property accessor methods:

Public String getTimeOut();
public void setTimeOut(String timeout);

wherein the accessor could be used from client code, as in the following example:

myTimerBean.setTimeout("3 seconds");

Finally, there may also be a derived XML schema for external configuration of the Control based upon the set of properties that are defined as externally configurable. This schema may be derived from the metadata attribute definition, not authored directly. The configuration of the timeout member based upon external configuration would look something like:

```
<timer:timer xmlns:timer="http://openuri.org/com/myco/TimerControl">
    <timer:timeOut>3 seconds</timer:timeOut>
</timer:timer>
```

In some embodiments, the mechanisms that can be used to set attribute values can be declaratively specified to ensure that the flexibility is not misused where it is not desirable. An attribute could be marked as 'read-only' from a programmatic perspective, and would only have a getter and not a setter, or a metadata-based attribute could be marked as bound in a 'final' way that prevents override by either external configuration or programmatic mechanisms. This is useful in the case when the J2EE system developer responsible for resource access definitions via controls might want to constrain the flexibility that the consumer (the developer) has in modifying those definitions upon use.

In some embodiments, three key roles can be defined for the configuration of a control:

Control Author, which defines the set of annotations and properties via the metadata that configure the behavior of a control, including whether the annotations can be externally overridden.

Control Consumer, which uses annotations to configure the control type or control instance. The control consumer may also use an interface (API) on the properties of the control to get/set the properties at runtime.

Application Deployer, which uses an external override mechanism (such as deployment plans) to configure the control for a specific runtime environment.

In some embodiments, a control author can mark an annotation in the metadata as externally configurable by adding a meta-annotation to the definition of the annotation. This approach may cause the control author to organize the annotations based (in part) on requirements for external override.

In some embodiments, the run-time configuration model is exposed as a set of properties to the consumer of a control. The shape of the properties may be defined by JSR175 annotations that (by convention) are nested in the public interface of the control. The concept of exposing runtime configuration via properties is important since it can provide a level of abstraction over the runtime interfaces(APIs) that are used to get annotation values. Control authors will use the APIs to get control properties. This notion of properties enforces the concept that properties are resolved via the precedence rules described above, rather than by direct access to the class files.

In some embodiments, there are several possible scenarios (in priority order) for an application deployer:

Overriding existing custom annotations on the definitions of a control. An non-limiting example is to replace the endpoint URL on the definition or declaration of a ServiceControl.

Adding policy-based annotations to control definitions, fields and methods. These are "common" or component specific (e.g. security, reliability, etc) rather than "custom" annotations. Such addition of policy based annotations enables a developer to build and test a application without knowing that these annotations will be required in a production environment.

Overriding "custom" annotations on the method level of a control.

Adding "custom" annotations that did not exist in the control.

In some embodiments, annotations can be migrated from the Java® doc form to the metadata form by expressing declarative constraints using JSR-175 annotations (attributes). Since JSR-175 does not define any semantic constraints meta-attributes should be defined and interpreted in order to apply semantic constraints. In order to associate a set of constraints with a control, a number of factors need to be considered:

Support for inheritance in controls and attribute declarations (attribute definitions may not extend other attributes).

Support for reuse of attributes across resource(component) types.

In some embodiments, an attribute that constrains a control can be nested in the public interface of a control. This approach can provide a number of benefits:

It is clear what the attribute is associated with.

It helps to minimize namespace collisions (i.e. the attribute name is qualified by the interface name).

It helps a consumer of the control to "see" the attribute via code completion.

A limitation of this approach is that it exposes the control interface to the control author. Since attribute definition is considered an advanced use of controls, so this is not unreasonable as long as it does not introduce additional complexity in the controls code generation/runtime.

In some embodiments, explicit specification via a meta-attribute can be used to associate attributes with the control. This can be used in likely cases where a control uses attribute defined in other namespaces, or where the control author did not want to nest the attributes in the public interface or if naming convention is not supported. A key consideration here is how this approach is handled in subclasses, wherein the set of included attributes should be the derived from all classes in the inheritance hierarchy. This is different than standard JSR-175 behavior where the derived attribute overrides any attribute in the super-class. Since attributes can actually express a contract and a derived class should not weaken that contract by defining a smaller set of attributes, two options can be adopted:

Enforcing that the most derived attribute re-define the attributes defined in all super-classes.

Aggregating the set of attributes along the inheritance path.

In some embodiments, a custom attribute (annotation) may be associated with a "control" or a "method" in the control, but not both. This is important is simplifying the model for overriding values on declarations (there are common attributes that are allowed on both controls and methods, e.g. @common:security, where the semantics of mixing locations should be well defined). JSR-175 provides meta-attributes to specify where attributes can exist. Three meta-attributes FIELD, TYPE and METHOD can be utilized to accomplish the categorization of attributes as control or method. In the following non-limiting example, the @Target ({TYPE, FIELD}) meta-attribute indicates that Connection-Attribute is a control attribute, and that the attribute can be on the control definition or the declaration:

```
@Retention(RetentionPolicy.RUNTIME)
@Inherited
@Target({TYPE, FIELD})
public @interface ConnectionAttribute {
    String dataSourceJndiName( );    // no default  ... value is
    required
}
```

In another non-limiting example, the @Target ({METHOD}) SqlAttribute attribute is defined as a method attribute, so it can only exist on operations:

```
@Retention(RetentionPolicy.RUNTIME)
@Inherited
@Target({METHOD})
public @interface SqlAttribute {
    String statement( );                   // no default ... value is
    required
    int arrayMaxLength( )                  default 1024;
    int maxRows( )                         default 0;
    CommandType commandType( )             default NONE;
    String rowsetName( )                   default "";
    String iteratorElementType( )          default "";
}
```

In some embodiments, further qualification of operation annotations as method, callback, or both can also be supported, which may allow control authors to specify that an annotation could only be used on methods in a callback. For example, the ServiceControl can use this feature to constrain conversation phases to continue and finish on callback methods.

In some embodiments, JSR175 can provide a mechanism for assigning a default value as part of the definition of a member, which is an element contained within a JSR 175 attribute. The default value must be type-consistent with the return type of the methods and it cannot be null. If there is no default value defined, then the declaration of the annotation must include the member (or a compile error will be generated). To avoid the compiler error, the member must have a default value even when a member is optional. If the member is optional, then the developer of the annotation will need to provide a "not really a default" default value, which will allow the annotation declaration to compile without the consumer providing a value. At runtime, the developer will know that the member value is not really a value if the value equals the default value. An interface such as java.lang.reflect.Method API now has a method to query the default value.

In some embodiments, the tooling that presents an editing (or override) user interface needs to know whether to show the default value to the user. There are two ways for the tooling to know that a default value really represents "optional":

Having a defined list of well-known "optional default" values (e.g. Integer.MIN_VALUE). Since there is a finite list of member types, the list of default values is fixed. The downsides to this approach include:
1. It's not explicit.
2. Although highly unlikely, user-defined annotations that need the defined optional value can be broken to be a real value (e.g. empty String or Integer.MAX_VALUE).
3. It does not support the scenario where a class member type is constrained using a template type.

Providing a meta-attribute that marks an annotation member as optional. This would give tooling a hint that:
4. The default value in the annotation is not really a default and should not be shown to the user.
5. A gesture like restore default value should not be associated with the member. Instead, there should be a "clear" gesture that indicates no value provided by the user.
6. The user may not be allowed to enter the default value into a property sheet or source view.

Using the meta-attribute approach, a set of constant values that represent optional default values can be defined. Instead of determining if a default value exists at runtime, this approach makes optional values more explicit in the definition of the annotation. An exemplary API usage would be something like:

```
@interface MyAttribute { int optionalInt( ) default Integer.
MIN_VALUE }
MyAttribute attr = ctx.getProperty(MyAttribute.class);
If(attr.optionalInt == Integer.MIN_VALUE) { // you could also check the
method default
    // user did not provide a value
}
```

Note that if a user defines a default using one of the constants without using the @Optional marker, the user will not get optional behavior in tooling. It is also important that the optional value must truly be a meaningless value for the associated member. The runtime can not tell if the value comes from the default or from a user provided value (on the declaration). So if a user sets the value of a member to Integer.MIN_VALUE, the runtime will ignore the value. A non-limiting example is shown below:

```
public @interface AnnotationWithAllBaseTypes {
    String aString( );
    @Optional
    String aStringOptional( ) default MemberTypes.
    OPTIONAL_STRING;
    String aStringWithDefault( ) default "defaultString";
    String[ ] strings( );
    @Optional
    String[ ] stringsOptional( ) default { };
    String[ ] stringsWithDefault( ) default {"S1","S2","S3","S4"};
}
```

In some embodiments, not only which members of an attribute are required, which are optional and their default values can be specified, members can also be grouped such that the existence rule is scoped to a subset of the members defined for an attribute. These existence rules may include, but are not limited to: Exactly-One, At-Most-One, At-Least-One, or All-If-Any. There are a number of approaches that trade complexity in the attributes for membership grouping rules, which may include:
1. Rule that applies to all members in the attribute (e.g. ServiceControl Location attribute). All members must have a default value.
2. Rule that by default applies to all members in the attribute, but has an optional member that lists the members covered by the rule. This would cover the case where a member is added to the service ServiceControl Location attribute, but that member is preferred to stand alone. The custom rule checker would have to make sure that:
   All listed names were in fact members of the attribute
   All listed names must have a default value.
   No names where listed more than once
   There are at least two members
3. Rule that allows specification of an array of the rule defined in 2. This provides the functionality that allows arbitrary groups along with stand alone attributes. However the checker would have to make sure that (in addition to the 2) no member is in more than one group.

Note that a reasonable balance should be made of complexity in defining the membership rules by utilizing a programmatic API with default implementations. A default model should be supported that applied to all members and an optional member to list the names of the members covered by the constraint. The following is an example of (1). The attribute defines a membership rule that applies to all members in the attributes:

```
public enum MemberhipRuleValues{
    AT_LEAST_ONE, AT_MOST_ONE,
    EXACTLY_ONE, ALL_IF_ANY
}
@Target(ANNOTATION) // defines this as a meta-attribute
@Retention(RetentionPolicy.RUNTIME)
public @interface MembershipRule {
    /** Required, the membership rule. */
    MemberhipRuleValues value( );
    /** Optional */
    String[ ] memberNames( ) default { };
}
```

In an attribute in ServiceControl, the declaration would also include the MemberGroup meta-attribute:

```
@Retention(RetentionPolicy.RUNTIME)
@Target({TYPE, FIELD})    // allowed on declaration
@MemberGroup(MemberhipRuleValues.AT_LEAST_ONE)  //
defaults to ALL-MEMBERS
@interface Location {
    String jmsUrl( ) default "";
    String httpUrl( ) default "";
}
```

If another member were later added to the attribute, the membership rule could be preserved by modifying the membership constraint to just apply to the original members:

```
@Retention(RetentionPolicy.RUNTIME)
@Target({TYPE, FIELD})    // allowed on declaration
@MemberGroup(
    MemberhipRuleValues.AT_LEAST_ONE,
```

```
       memberNames={"jmsUrl", "httpUrl"})
    @interface Location {
        String jmsUrl( ) default "";
        String httpUrl( ) default "";
        String someNewMember;
    }
```

In some embodiments, the use of an array type in an attribute defines that member as multi-valued. For example, the ServiceControl could define the endpoint as:

```
       public @interface Connection {
           String[ ] httpUrl;
       }
```

This indicates that the control implementation can accept a number of URLs and would try each in order when attempting a connection, which leads to a complication in specifying required/optional/default semantics. Since there is no default value, any use of the attribute will require an initialized value for httpURL. A meta-attribute can be defined that bound the array size for any array-based member, such as:

```
       public @interface Connection {
           @MemberConstraint.ArraySize(min=1,max=2)
           String[ ] httpUrl;
       }
```

An alternative approach would be to identify the parameters explicitly:

```
       public @interface Connection {
           String primaryHttpUrl;
           String secondaryHttpUrl default "";
       }
```

In some embodiments, the ability to define control annotations that occurred more than once in a particular location is supported. The control developer utilize an API provided such as getAttribute( ) by the control that may return multiple values. Since JSR-175 prohibits multiple occurrences, the migration of control annotations with multiple occurrences can be accomplished by defining the attribute as a member type, then defining an "outer" attribute that declares an array of the "core" type. To illustrate such scenario, an non-limiting example of control annotations on Java® Messaging Service (JMS) Properties is shown below:

```
   /**
    * this method will send a javax.jms.TextMessage to send-jndi-
          name
    * @jc:jms-property value="value1" key="key1"
    * @jc:jms-property value="value2" key="key2"
    */
   public void sendTextMessage(String payload);
```

The corresponding attribute definition in JSR-175 would be:

```
   /**
    * Two definitions are needed since there is no support
    * for "multiple occurs" in JSR175
    */
   @Inherited
   @Retention(RetentionPolicy.RUNTIME)
   @Target(ElementType.METHOD)
   @interface JmsProperties {
        JmsProperty[ ] value( );
   }
   /**
    * A single property key value. This type is only
    * permitted to define the type of an Attribute member.
    */
   @Inherited
   @Retention(RetentionPolicy.RUNTIME)
   @Target({ })   // Only allowed as a Member Type
   @interface JmsProperty {
        String key( );
        String value( );
   }
```

In some embodiments, whether an attribute can be located on the declaration of a type can also be specified. When located on the declaration, the attribute can be treated as a parameterized constructor for the instance. JSR-175 defines FIELD as an enumerated location for an attribute. The checker can insure that the field is a declaration of a type that permits the attribute as one of the following:

@Target({TYPE, FIELD}) //allowed on JCX and declaration

@Target(TYPE) //allowed on JCX only

The corresponding attribute declaration in JSR-175 of the example discussed above can be:

```
       @JmsProperties({
           @JmsProperty(key="key1",value="value1"),
           @JmsProperty(key="key2", value="value2")
       })
       public void sendTextMessage(String payload);
```

In some embodiments, a core set of constrained types can be defined to provide a declarative configuration model. This set of types should be easily mapped to XML schema types in order to facilitate the ability to externally override the values as part of the deployment process. The predefined types may include, but are not limited to the following types:

| Type | Facets (Each Type also allows a Default value) |
| --- | --- |
| Text | IsLong (editing model), MaxLength |
| Date | MinValue, MaxValue |
| Decimal | Places, MinValue, MaxValue |
| Integer | MinValue, MaxValue |
| Enumeration | Valid Value List |
| Boolean | True\|False |
| URI, URN, URL | N/A |
| XML (well formed) | N/A |
| QNAME | N/A |
| Classname(s) | N/A |
| FilePath | N/A |

In some embodiments, a control author may define a custom type along with an associated "validator" in cases where the predefined set of member types is not sufficient.

Following is a non-limiting example of annotating an attribute member to indicate that it is a custom type:

```
/**
 * Member is a Custom Type. Control author
 * must provide a name and .class that implements
 * the ValidateMember interface.
 * Valid on any Member definition.
 */
@Target(METHOD)
@Retention(RetentionPolicy.RUNTIME)
public @interface Custom {
    String name( );
    Class<? extends ValidateMember> validator( );
}
```

In some embodiments, a control can provide a mechanism to constrain a method attribute to either a Callback or Operation. Such a control can be a ServiceControl used to constrain the list of conversation phases on callbacks. A "method" meta-attribute can be defined to carry this operation as shown in the following non-limiting example:

```
/**
 * Common MemberConstraints
 * <p>
 * Note: JSR175 does not define a @Target location
 * for Annotation Members.
 */
public interface MemberConstraints {
    /**
     * Used to further constrain METHOD annotations. In 8.1
     * Operation Tags could be constrained to:
     * operation
     * callback
     * both (default)
     */
    public enum MethodTypeValues {
        OPERATION_ONLY, CALLBACK_ONLY
    }
    /**
     * Used to further constrain METHOD annotations
     */
    @Retention(RetentionPolicy.RUNTIME)
    @Target(ElementType.ANNOTATION_TYPE)
    public @interface MethodType {
        MethodTypeValues value( );
    }
}
```

In some embodiments, JSR-175 defines a specific set of valid types that can be used as members in an annotation definition in metadata. There are some types where it does not make sense to support external override, such as class and class[ ], byte and byte[ ], etc. For these cases where external override is not meaningful, a user could:

Disallow a meta-attribute such as AllowExternalOverride when the Attribute includes any of those types.

Ignore those member types that are not reasonable to override (i.e. put the member in the metadata with an indication that it's can not be overridden).

In some embodiments, the separation of custom and common annotations may support the tooling (operating) of common annotations when the same generalized tooling is not supported for custom annotations. An non-limiting example can be the adding/overriding of annotations at the method level of a control. The underlying deployment plan of a deployed resource may use the same structure to support general adding/overriding for common annotations. In addition, a specific set of tasks may also be supported that are independent of generalized annotation override, which gives the user the ability to include information in the metadata that is only relevant to the support of common annotations (e.g. methods that represent external callbacks).

In some embodiments, the process of populating the deployment descriptor/plan may depend on information about annotations and the annotated code contained in the resource being deployed. Such information can be provided to the control by creating an external configuration module (a manifest) and reference the manifest during the deployment/configuration process In some embodiments, a manifest can be generated that enumerates the annotations that have been marked via the AllowExternalOverride meta-attribute when the resource is deployed. The manifest represents a "secondary" deployment descriptor and can be used to establish the bounding for properties in the control.

In some embodiments, the manifest can be organized to include "what can be" and "what is" (with regard to annotations). This can provide a context for expressing the runtime annotation overrides in terms of explicit add, change, or remove actions. The problem with this approach is that it may make for a wide-open module for external configuration. Without some guidance, application deployers would probably be overwhelmed.

In some embodiments, the manifest can be organized to only describe "what is" (with regard to annotations). The runtime annotation overrides are then assumed to have "add if absent, replace if present" semantics. As noted above, this may limit the tooling support to overriding existing custom annotations, while permitting the addition of only common or component specific annotations. A full override/add experience for application deployers can be supported under an IDE based administrative tool. However with console-based deployment, a module that only includes custom annotations that exist in the manifest, along with enough information to support adding policy based annotations, is more likely.

In some embodiments, an event listener can be implemented that will be triggered on deployment and redeployment of the external configuration module. Under this scenario, the resource (application) does not need to be redeployed to enable configuration change, minimizing the chances of an application failing at runtime. An error condition may cause the deployment/redeployment of the external configuration module to fail (the existence of warnings, however, will not cause the deployment to fail).

In some embodiments, the control is capable of validating the incoming data of the external configuration module during it redeployment. If there are errors, the redeployment is vetoed. The control may also gather any validation errors and return them through the deployment infrastructure in a manner that makes it clear which part of the configuration failed and reports issues reported for the failed part.

In some embodiments, the control may produce log messages that include the following:
Info: logging the before and after values for annotations
Warning: existence of override values for annotation types that did not exist before
Error: any parse errors or semantic errors in the deployment plan, and inconsistencies between the deployment plan and the annotation types defined by the configuration module.

In some embodiments, it is important to identify an annotation, which can enable a mechanism that can take an annotation instance and find any relevant annotation override values in order to support external override of annotations. Such an annotation can be uniquely identified by constructing a path that includes the type and location of the annotation. Since annotations can be nested, there is no "fixed" structure for the path. The following describes one approach by which the path can be built:

annotated-class-name:[field-name|method-name]:
annotation-class-name[(0 . . . n) member-name]

wherein the path may begin with an annotated control type and the annotation can exist directly on the type, on a field of the type, on a method of type, or as a (nested) member of an annotation in any of the above mentioned locations. Since fields and methods do not share a namespace, the method or field name has to be included in order to have a valid path.

In some embodiments, a control implementation class that asks for annotation values should get the same result for subsequent requests within the same on Acquire( )/on Release( ) invocation (i.e. repeatable-read semantics). If an implementation wants a stable value for annotations during the life of the instance, then they should only request annotation values during the on Create( ) event.

In some embodiments, a control developer may use appropriate exceptions to signal any failure that is associated with configuration data. If validation is performed during initialization, then there should be no infrastructure related failures during invocation. The control may also publish invocation statistics into JMX, which should show the original value and the configured value for those annotations that have been externally overridden.

In some embodiments, the integration of annotation overrides can be made explicit via a deployment descriptor in XML format, which allows a user to declare (as part of a module) the association between the annotation metadata and the control. FIG. 6 is the XML source code of an exemplary descriptor defining such association.

In some embodiments, the external configuration module can define member override values as @dynamic, meaning that they can be updated without having to re-deploy the resource. This implies that there is a listener that can listen for changes and apply them "on-the-fly". If we non-dynamic properties need to be supported, the following two changes can be made as shown in FIG. 7:

Define a new meta-annotation that indicates a non-dynamic annotation.
Extend the configuration to define a dynamic and non-dynamic property.

In some embodiments, the control author may want to include the ability to use a factory module in addition to declarative construction/initialization by the metadata. Without an annotated field, the following ways can be used to identify the fact that the call to the factory included initialization values and what those values were:

Explicitly say that field-level annotation overrides are not supported for non-declarative fields.
Define a meta-attribute that goes over the field. That would let the developer flag the field and get the initialized values from the create method (i.e. how to get them into the manifest).

In some embodiments, the control author may want to:
Force the override of an annotation—An example is the ServiceControl. A meta-attribute may be defined that forces (or strongly encourages) the user to provide a value.
Lock down an annotation—For logical rather than physical binding, there may be cases where the control author declared that the annotation might be externally overridden, but control consumer may want to veto any external override.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, class, method, type, interface, component, object model, and other suitable concepts. While the concept "interface" is used in the embodiments of the systems and methods described above, it will be evident that such concept can be interchangeably used with equivalent concepts such as, bean, class, method, type, component, object model, and other suitable concepts. While the concept "instance" is used in the embodiments of the systems and methods described above, it will be evident that such concept can be interchangeably used with equivalent concepts such as, object, and other suitable concepts. While the concept "property" is used in the embodiments of the systems and methods described above, it will be evident that such concept can be interchangeably used with equivalent concepts such as, attribute, annotation, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a control architecture, comprising:
one or more resources residing on a machine,
wherein each of the one or more resources is used to assemble an application or a service;
a control, which is an object-oriented software component model capable of exposing a plurality of properties or a plurality of operations of a resource in the one or more resources; and
a resource client capable of at least one of the following via the control:
performing the plurality of operations to access and configure the plurality of properties of the resource; and
retrieving data from the resource;
a resource proxy associated with the one or more resources,
wherein the resource proxy is capable of enacting the plurality of operations requested by the resource client,
wherein the control manages the state and lifetime of the resource proxy, coordinated by a set of resource management notification events that are provided to the control indicating the resource scope; and
wherein access to the one or more resources is parameterized by metadata annotation declared on the control.

2. The system according to claim 1, wherein:
the control architecture is implemented in Java® on J2EE platform.

3. The system according to claim 1, wherein:
each of the one or more resources is one of an enterprise application component, a component type, a protocol, and a system service.

4. The system according to claim 1, wherein:
the object-oriented software component model is one of a Java® bean, an enterprise Java® bean (EJB), an interface, a class, and a module.

5. The system according to claim 4, wherein:
the object-oriented software component model is based on one of Java®, C++, CORBA, RMI, and DOM.

6. The system according to claim 4, wherein:
the control comprises of a control public interface, a control implementation class, and a control bean wrapper class.

7. The system according to claim 1, wherein:
the control is capable of at least one of:
interacting with the resource client in a two-way style;
customizing the view of the plurality of properties or operations exposed;
integrating or interacting with other container, component, or service;
managing the one or more resources and keeping such management transparent to the resource client; and
nesting another control in a composition model.

8. The system according to claim 1, wherein:
the control is packaged in a JAR model for distribution.

9. The system according to claim 1, wherein:
an operation in the plurality of operations is capable of setting the value of each of the plurality of properties programmatically.

10. The system according to claim 1, further comprising:
a resource proxy associated with the resource, wherein the resource proxy is capable of enacting the plurality of operations requested by the resource client.

11. A method to provide a control architecture, comprising:
exposing a plurality of properties or a plurality of operations of a resource in one or more resources via a control, which is an object-oriented software component model,
wherein access to the one or more resources is parameterized by a metadata annotation declared on the control;
enacting the plurality of operations requested by the resource client by a resource proxy that is associated with the one or more resources, and
wherein the control manages the state and lifetime of the resource proxy, coordinated by a set of resource management notification events that are provided to the control indicating the resource scope;
performing the plurality of operations to access or configure the plurality of properties of the resource; and
retrieving data from the resource.

12. The method according to claim 11, wherein:
the resource is used to assemble an application or service.

13. The method according to claim 11, wherein:
the control comprises of a control public interface, a control implementation class, and a control bean wrapper class.

14. The method according to claim 11, wherein:
the control is capable of at least one of:
interacting with the resource client in a two-way style;
customizing the view of the plurality of properties or operations exposed;
integrating or interacting with other container, component, or service;
managing the one or more resources and keeping such management transparent to the resource client; and
nesting another control in a composition model.

15. The method according to claim 11, further comprising at least one of:
packaging the control in a JAR model for distribution;
setting the value of each of the plurality of properties programmatically via an operation in the plurality of operations; and
enacting the plurality of operations requested by the resource client via a resource proxy associated with the resource.

16. A machine readable medium having instructions stored thereon that when executed cause a system to:
expose a plurality of properties and a plurality of operations of a resource in one or more resources via a control, which is an object-oriented software component model,
wherein access to the one or more resources is parameterized by a metadata annotation declared on the control;
enact the plurality of operations requested by the resource client by a resource proxy that is associated with the one or more resources, and
wherein the control manages the state and lifetime of the resource proxy, coordinated by a set of resource management notification events that are provided to the control indicating the resource scope;
perform the plurality of operations to access or configure the plurality of properties of the resource; and
retrieve data from the resource.

17. The machine readable medium of claim 16, wherein:
the resource is used to assemble an application or service.

18. The machine readable medium of claim 16, wherein: the control comprises of a control public interface, a control implementation class, and a control bean wrapper class.

19. The machine readable medium of claim 16, wherein: the control is capable of at least one of:
   interacting with the resource client in a two-way style;
   customizing the view of the plurality of properties or operations exposed;
   integrating or interacting with other container, component, or service;
   managing the one or more resources and keeping such management transparent to the resource client; and
   nesting another control in a composition model.

20. The machine readable medium of claim 16, further comprising instructions that when executed cause the system to perform at least one of:
   package the control in a JAR model for distribution;
   set the value of each of the plurality of properties programmatically via an operation in the plurality of operations; and
   enact the plurality of operations requested by the resource client via a resource proxy associated with the resource.

* * * * *

UNITED STATES PATENT AND TRADEMARK OFFICE
CERTIFICATE OF CORRECTION

PATENT NO.        : 7,343,379 B2                                          Page 1 of 2
APPLICATION NO. : 11/041588
DATED             : March 11, 2008
INVENTOR(S)       : Marvin et al.

It is certified that error appears in the above-identified patent and that said Letters Patent is hereby corrected as shown below:

In the Drawings: On sheet 2 of 7, in Figure 2, Box 204, line 1, delete "resouce" and insert -- resource --, therefor.

In column 6, line 61, delete "on Acquire" and insert -- onAcquire --, therefor.

In column 6, line 64, delete "onacquire" and insert -- onAcquire --, therefor.

In column 6, line 67, delete "on Acquire" and insert -- onAcquire --, therefor.

In column 7, line 19, delete "on Acquire" and insert -- onAcquire --, therefor.

In column 7, line 22, delete "on Release" and insert -- onRelease --, therefor.

In column 8, line 53-54, delete "on Timeout" and insert -- onTimeout --, therefor.

In column 11, line 9, delete "An non-limiting" and insert -- A non-limiting --, therefor.

In column 11, line 16–17, delete "a application" and insert -- an application --, therefor.

In column 11, line 26–27, delete "constraints meta" and insert -- constraints, meta --, therefor.

In column 14, line 32, delete "Memberhip" and insert -- Membership --, therefor.

In column 14, line 40, delete "Memberhip" and insert -- Membership --, therefor.

In column 14, line 51, delete "(Memberhip" and insert -- (Membership --, therefor.

In column 14, line 66, delete "Memberhip" and insert -- Membership --, therefor.

In column 15, line 42, delete "HttpUrl" and insert -- httpUrl --, therefor.

In column 15, line 43, delete "HttpUrl" and insert -- httpUrl --, therefor.

CERTIFICATE OF CORRECTION (continued)
U.S. Pat. No. 7,343,379 B2

In column 15, line 56, delete "an non-limiting" and insert -- a non-limiting --, therefor.

In column 17, line 62, delete "An non-limiting" and insert -- A non-limiting --, therefor.

In column 18, line 11, after "process" insert -- . --.

In column 19, line 6, delete "name[(0...n)" and insert -- name:[(0,...,n) --, therefor.

In column 19, line 16–17, delete "on Acquire( )/on Release( )" and insert -- onAcquire()/onRelease() --, therefor.

In column 19, line 20, delete "on Create( )" and insert -- onCreate() --, therefor.

Signed and Sealed this

Sixteenth Day of March, 2010

David J. Kappos
*Director of the United States Patent and Trademark Office*